UNITED STATES PATENT OFFICE.

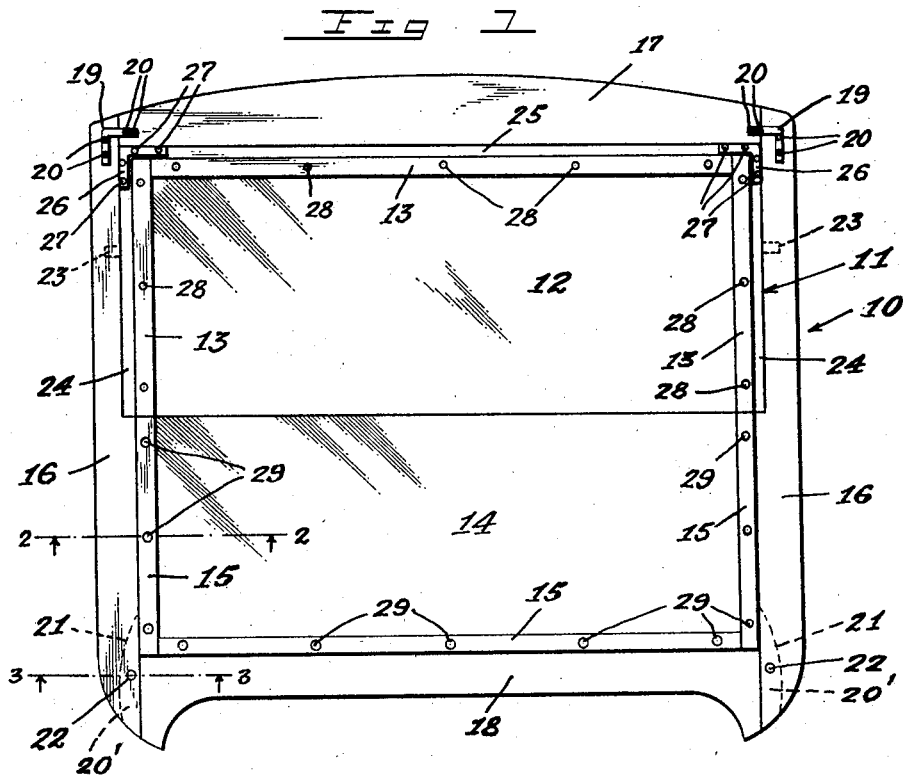

ARTHUR J. STRETCH, OF SEATTLE, WASHINGTON.

WINDSHIELD.

1,394,045.   Specification of Letters Patent.   Patented Oct. 18, 1921.

Application filed April 26, 1920. Serial No. 376,843.

*To all whom it may concern:*

Be it known that I, ARTHUR J. STRETCH, a citizen of the United States, residing at Seattle, in the county of King and State of Washington, have invented a certain new and useful Improvement in Windshields, of which the following is a specification.

My invention relates to improvements in wind shields for motor vehicles and the object of my invention is to provide a wind shield of novel construction wherein the upper and lower plates of glass are rigidly secured within their frames to positively eliminate the tendency of the plates of glass to rattle while the vehicle is in motion.

Another object is to provide an adjustable mechanism adapted to rigidly secure the plates of glass within their frames.

A further object is to provide a windshield embodying strength, simplicity, economy and durability in construction and that will not readily get out of order.

With the above and other objects in view which will appear as the description proceeds, my invention resides in the novel feature of construction, combination, adaptation and arrangement of parts hereinafter described and claimed.

I accomplish these objects by devices illustrated in the accompanying drawings, wherein—

Figure 1 is a view in front elevation of a wind shield embodying my invention;

Fig. 2 is a view in transverse section on broken line 2, 2 of Fig. 1, illustrating the method of securing the plates of glass within the frame of the wind shield; and Fig. 3 is a view in transverse section on broken line 3, 3 of Fig. 1, illustrating the form of tenon joint used in the construction of the frame of the wind shield.

Referring to the drawings, throughout which like reference numerals indicate like parts, the windshield shown in the drawings comprises a main frame 10, an angularly adjustable frame 11, an upper plate of glass 12, retaining strips 13, a lower plate of glass 14 and retaining strips 15.

The main frame 10 comprises upright members or stiles 16, an upper transverse member 17 and a lower transverse member 18.

The transverse member 17 is rigidly secured to the upper ends of the upright members 16 by angular strips 19 and screws or rivets 20 while the transverse member 18 is rigidly secured to the lower ends of the upright members 16 by tenons 20' formed on the ends of the transverse member 18 which tenons 20' seat in the mortise cavities 21 cut in the lower inner side faces of the upright members 16 and being further secured against dislodgement by bolts 22 as shown in Fig. 3.

Pivotally mounted in the upper half of the wind shield as at 23 is the angularly adjustable frame 11 comprising side members 24 and a cross member 25 which is rigidly connected to the side members by angular strips 26 and screws or rivets 27.

The upper plate of glass 12 is disposed within the frame 11 and is rigidly secured therein by the retaining strips 13 and bolts 28.

The lower plate of glass 14 is disposed within the lower half of the main frame 10 and is rigidly secured therein by the retaining strips 15 and bolts 29.

The inner edge portions of the main frame 10 below the adjustable frame 11 and the inner edge portions of the said adjustable frame are similarly cut or formed as shown in the transverse section in Fig. 2, while the retaining strips 13 and 15 are similarly cut or formed.

In view of the foregoing description it is thought that a description of the portion of the wind shield taken on broken line 2, 2 of Fig. 1 will suffice.

The upright member 16 is cut away on its inner edge to provide a plane surface 30 and a substantially perpendicular wall 31 which is slightly undercut with respect to the plane of the side of the member 16 as shown in Fig. 2.

The strip 15 is formed in the desired shape by cutting away the lower portion of its outer edge to provide a shoulder 32 and a plane surface or wall 36; and to provide a bearing surface 33 the lower portion of the inner edge of said strip is undercut as shown in Fig. 2.

The strip 15 is provided with suitable holes 34 for the reception of bolts 29, which holes 34 are somewhat larger in diameter than said bolts 29.

To assemble the various elements comprising my windshield the glass 14 is first positioned on the member 16 so that its edge rests on the outer edge of the plane surface 30, the strip 15 is next positioned and secured to the member 16 by the bolts 29. In this position the shoulder 32 of the strip 15 will bear against the upper surface of the member 16 adjacent the corner 35 on said member, the said corner 35 is adapted to seat in the corner 37 in the strip 15 to thereby provide a fulcrum on which said strip will pivot to thus obtain the desired pressure upon the glass plate 14 at the point where the surface 33 of the strip 15 engages said glass plate when the bolts 29 are tightened.

Should the strip 15 be unevenly cut or become warped the undercut wall 31 on the member 16 in conjunction with the holes 34 in the strip 15 will permit pivotal movement of said strip thereby obtaining the desired pressure upon the edge of the glass plate 14 before the wall 36 comes in contact with the wall 31.

From the foregoing description taken in connection with the accompanying drawings, the advantages of the construction and of the method of operation will be readily apparent to those skilled in the art to which the invention pertains, and while I have described the principle of operation of the invention, together with the device which I now consider to be the best embodiment thereof, I desire to have it understood that the device shown is merely illustrative and that changes in the dimensions, form and arrangement of parts of my invention may be resorted to without departing from the spirit thereof.

What I claim is:

1. In a wind shield comprising a frame having a portion of its inner edges cut away to form a seat, a plate of glass disposed in one portion of said seat, a strip having its outer edge undercut to form a shoulder that is adapted to bear against the side surface of said frame adjacent its inner edge for pivotal movement thereon, said strip also having its inner edge undercut and adapted to engage said glass, and adjustable securing means for said strip.

2. In a wind shield comprising a frame having a portion of its inner edges cut away to form a seat, a plate of glass disposed in one portion of said seat, a plurality of strips having their outer edges undercut to form shoulders adapted to bear against the side surfaces of said frame adjacent its inner edges for pivotal movement thereon, the said strips also having their inner edges undercut to form a bearing edge that is adapted to engage the said glass and adjustable securing means for said strips adapted to pass through suitable apertures in said frame and strips, the apertures in said strips being somewhat larger in diameter than said securing means.

3. In a wind shield comprising upright side members, upper and lower transverse members having a portion of their inner edges cut away to form a seat, a plate of glass disposed within said seat, strips having their inner edges cut away to form shoulders that are adapted to bear against the side surfaces adjacent the inner edges of said members for pivotal movement thereon, the said strips also having a portion of their inner edges undercut to provide an edge adapted to engage the surface of the said glass plate adjacent its edges thereof, and bolts adapted to pass through suitable holes formed in said strips and transverse members to secure said strips upon said transverse members, the said holes in said strips being somewhat larger in diameter than said bolts.

4. In a wind shield comprising a frame having a portion of its inner edge cut away to form a seat having a plane surface in parallel relation to the side surfaces of said frame and having a plane surface angularly disposed to the first named plane surface, a glass plate disposed in one portion of said seat, a strip having its outer edge undercut to form a shoulder thereon, that is adapted to bear against one of the side surfaces of said frame adjacent the said undercut plane surface for pivotal movement thereon, the inner edge of said strip being angularly cut away on its lower portion to form a bearing edge that is adapted to engage the upper surface of the glass plate adjacent the edge thereof, and adjustable securing means for said frame and said strip.

In witness whereof, I hereunto subscribe my name this 20th day of April, A. D. 1920.

ARTHUR J. STRETCH.